(12) United States Patent
Leyva (10) Patent No.: US 6,877,310 B2
(45) Date of Patent: Apr. 12, 2005

(54) SHOCK WAVE REFLECTOR AND DETONATION CHAMBER

(75) Inventor: Ivett Alejandra Leyva, Niskayuna, NY (US)

(73) Assignee: General Electric Company, Niskayuna, NY (US)

(*) Notice: Subject to any disclaimer, the term of this patent is extended or adjusted under 35 U.S.C. 154(b) by 30 days.

(21) Appl. No.: 10/107,653

(22) Filed: Mar. 27, 2002

(65) Prior Publication Data

US 2003/0182927 A1 Oct. 2, 2003

(51) Int. Cl.[7] ................................................. F02C 5/00
(52) U.S. Cl. ...................... 60/247; 60/39.38; 60/39.76; 431/1
(58) Field of Search .......................... 60/247, 245, 249, 60/39.38, 39.39, 39.4, 39.76, 39.77, 39.78, 39.79, 39.8, 39.81; 431/1

(56) References Cited

U.S. PATENT DOCUMENTS

| | | | | |
|---|---|---|---|---|
| 3,263,418 A | * | 8/1966 | Lange et al. | 60/247 |
| 3,674,409 A | * | 7/1972 | Desty et al. | 431/1 |
| 3,954,380 A | * | 5/1976 | Valaev et al. | 431/1 |
| 4,519,453 A | * | 5/1985 | Riddiford | 431/242 |
| 4,669,658 A | * | 6/1987 | Nevgod et al. | 239/81 |
| 5,513,489 A | | 5/1996 | Bussing | |
| 5,800,153 A | * | 9/1998 | DeRoche | 431/1 |
| 5,901,550 A | | 5/1999 | Bussing et al. | |
| 6,062,018 A | | 5/2000 | Bussing | |
| 6,347,509 B1 | | 2/2002 | Kaemming et al. | |

FOREIGN PATENT DOCUMENTS

EP 1138922 4/2001

OTHER PUBLICATIONS

Shepherd et al, "Detonation Initiation, Propogation, and Structural Response".* van Wingerden et al, "Detonations in pipes and in the open".*

Guo, C. "Experimental study of gaseous detonation propagation over acoustically absorbing walls", Shock Waves 2002, pp 353–359.*

Auffret, Y. "Detonability of C2H2–O2 mixtures at elevated intial temperature".*

S. R. Tieszen, D. W. Stamps, C. K. Westbrook and W. J. Pitz, Gaseous hydrocarbon—air detonations. Combustion and Flame, 84:376–390, 1991.*

D.C. Bull, J.E. Elsworth, P.J. Shuff, and E. Metcalfe. Detonation cell structures in fuel/air mixtures. Combust. Flame, 45(1):7–22, 1982.*

(Continued)

*Primary Examiner*—Ted Kim
(74) *Attorney, Agent, or Firm*—Richard A. DeCristofaro; Patrick K. Patnode (57) ABSTRACT

A shock wave reflector includes a number of reflective units positioned along a longitudinal direction and separated by a gap G. Each reflective unit has a length L. The length L and the gap G are governed by a relationship $L+G \geq \lambda$. The variable $\lambda$ characterizes a cell size for a detonation mixture. A detonation chamber includes a receiving end, a discharge end, and a wall extending along a longitudinal direction between the receiving and discharge ends. The detonation chamber further includes a number of reflective units formed in the wall and positioned along the longitudinal direction. The reflective units are separated by a gap G, and each reflective unit has a length L.

22 Claims, 12 Drawing Sheets

OTHER PUBLICATIONS

M. Cooper, S. Jackson, J. Austin, E. WIntenberger, J.E. Shepherd, "American Institute of Aeronautics & Astronautics Paper 01–3812", 37th AIAA/ASME/SAE/ASEE Joint Propulsion Conference and Exhibit, pp. 1–10.

F. Schauer, J. Stutrud, R. Bradley, "American Institute of Aeronautics & Astronautics Paper 2001–1129", 39TH AIAA Aerospace Sciences Meeting & Exhibit, Jan. (2001), pp. 1–9.

J. Chao, John H.S. Lee, "18th International Colloquium on the Dynamics of Explosions and Reactive Systems Program," Premixed Turbulent Flames III, Jul. 29–Aug. 3, 2001, Abstract #215, p. 55.

A. Eder, F. Pintgen, F. Mayinger, "18th International Colloquium on the Dynamics of Explosions and Reactive Systems Program," Propagation of Fast Deflagrations and Marginal Detonations in Hydrogen–Air–Additive Mixtures, Jul. 29–Aug. 3, 2001, Abstract #181, p. 82.

T. Fujiwara, A. Takasu, T. Miyasaka, 18th International Colloquium on the Dynamics of Explosions and Reactive Systems Program, Detonation Propagation in Variable Cross Section Channels, Jul. 29–Aug. 3, 2001, Abstract #180, p. 103.

E. Furlong, I. Leyva, S. Sanderson, 18th International Colloquium on the Dynamics of Explosions and Reactive Systems Program, MEMS–Based Pulse Detonation Engines for Small–Scale Propulsion.

"Investigation of Deflagration to Detonation Transition for Application to Pulse Detonation Engine Ignition Systems", by E. Schultz et al., JANNAF conference, http://www.galcit.caltech.edu/EDL/publications/reprints/jannaf99_paper.pdf. Oct. 8, 1999.

* cited by examiner

SHOCK WAVE REFLECTOR AND DETONATION CHAMBER

STATEMENT REGARDING FEDERALLY SPONSORED RESEARCH & DEVELOPMENT

This invention was made with Government support under contract number DABT 63-00-C-001 awarded by DARPA. The Government has certain rights in the invention.

BACKGROUND

The invention relates generally to pulse detonation engines and, more particularly, to enhancement of detonation for pulse detonation engines.

Pulse detonation engines detonate a fuel and oxidizer mixture, producing hot combustion gases, which have increased temperature and pressure and are propagated at supersonic speeds. The hot combustion gases are directed from the engine to produce thrust.

Figure 1:
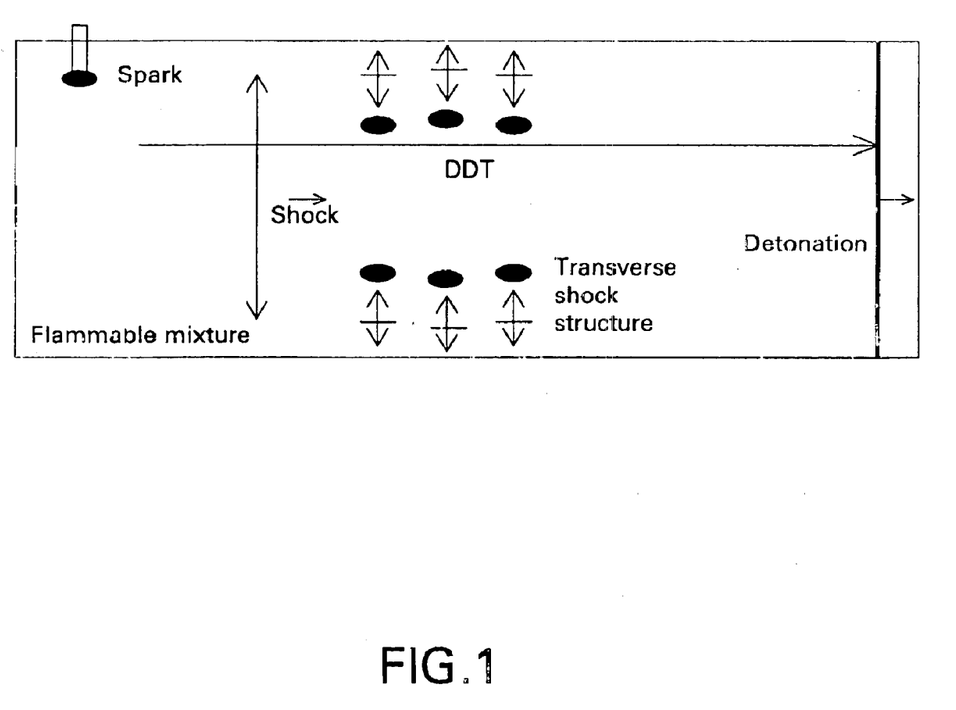
FIG. 1 illustrates a typical configuration for detonation for a pulse detonation engine.

A representative configuration for detonation for a pulse detonation engine is illustrated in FIG. 1. As shown, a spark initiates the detonation process. If the spark has enough energy for the fuel and air mixture, a shock is initiated and travels to the right. As the shock processes the fuel and air mixture and turbulence is developed, formation of a transverse wave structure is initiated. Reflection of the transverse shock waves from the walls of the detonation chamber (shown here as cylindrical) creates interactions between the transverse shock waves, which result in "hot spots," which have high local values of temperature and pressure and seed detonation.

Exemplary fuel and air mixtures for pulse detonation engines include liquid fuel and air mixtures. One problem with liquid fuel/air detonation is a long deflagration-to-detonation transition (DDT) length, which is typically larger than several meters.

Attempts have been made to decrease the DDT length by placing obstacles inside a detonation chamber, such as the augmentation device discussed in U.S. Pat. No. 5,901,550, by Bussing et al. and assigned to Adroit Systems, Inc. The augmentation device consisted of threading the interior surface of the inlet end of the detonation chamber with a helical-type thread to provide a ridged surface. Other attempts to decrease the DDT length include using pre-detonators and improving the combination of spark energy and position, detonation chamber geometry, and fuel/air properties.

Although some success has been achieved, shorter DDT lengths remain a central challenge for liquid fuel detonation systems. It would therefore be desirable to reduce the DDT length and, more particularly, to provide a detonation chamber having a reduced DDT length.

BRIEF DESCRIPTION

Briefly, in accordance with one embodiment of the present invention, a shock wave reflector is disclosed and includes a number of reflective units positioned along a longitudinal direction and separated by a gap G. Each reflective unit has a length L. The length L and the gap G are governed by a relationship $L+G \geq \lambda$. The variable $\lambda$ characterizes a cell size for a detonation mixture.

In accordance with another embodiment of the present invention, a detonation chamber is disclosed and includes a receiving end, a discharge end, and a wall extending along a longitudinal direction between the receiving and discharge ends. The detonation chamber further includes a number of reflective units formed in the wall and positioned along the longitudinal direction. The reflective units are separated by a gap G, and each reflective unit has a length L.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 3:
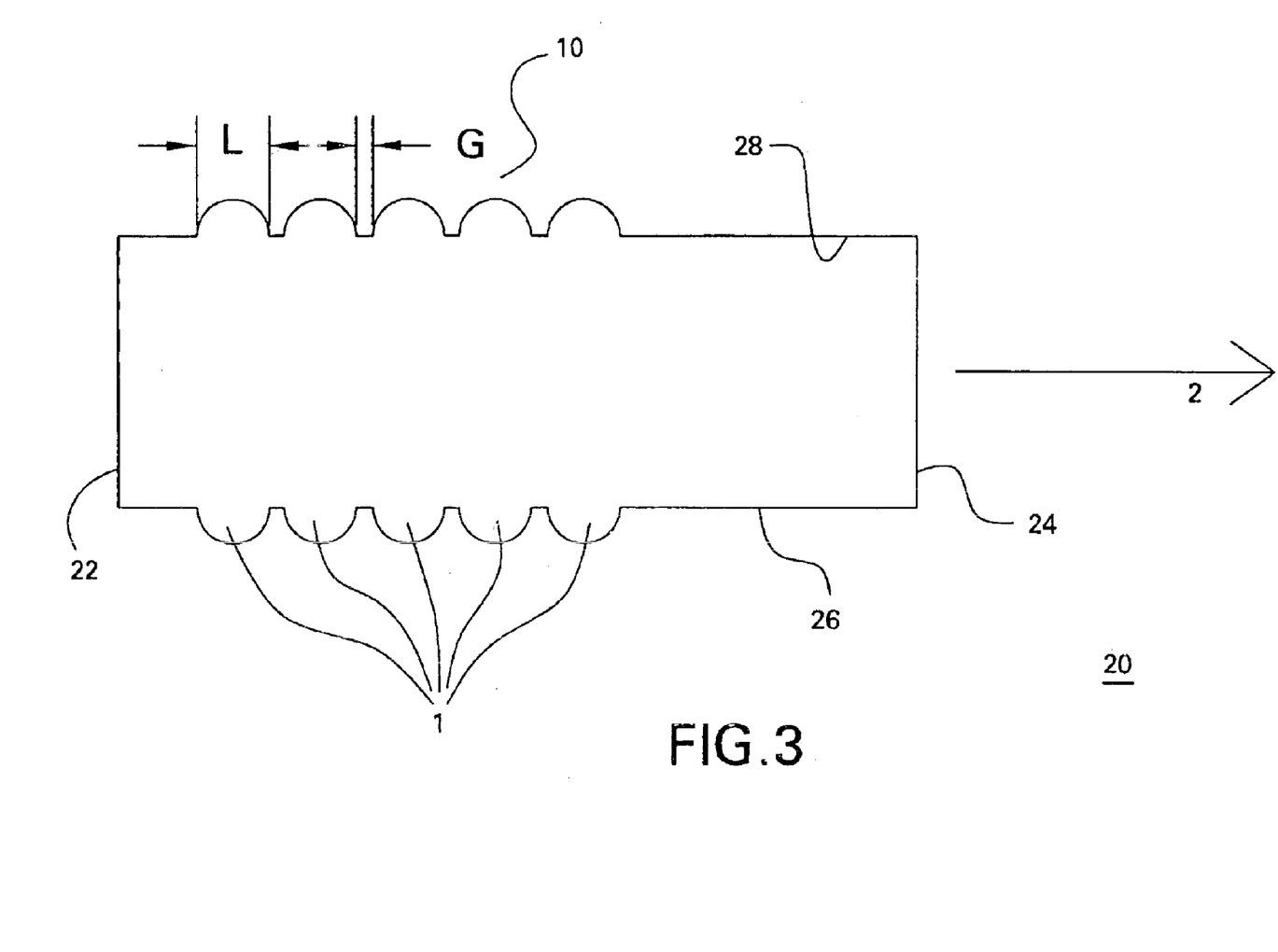
FIG. 3 illustrates a detonation chamber embodiment and a shock wave reflector embodiment of the invention in cross-sectional view.
Figure 4:
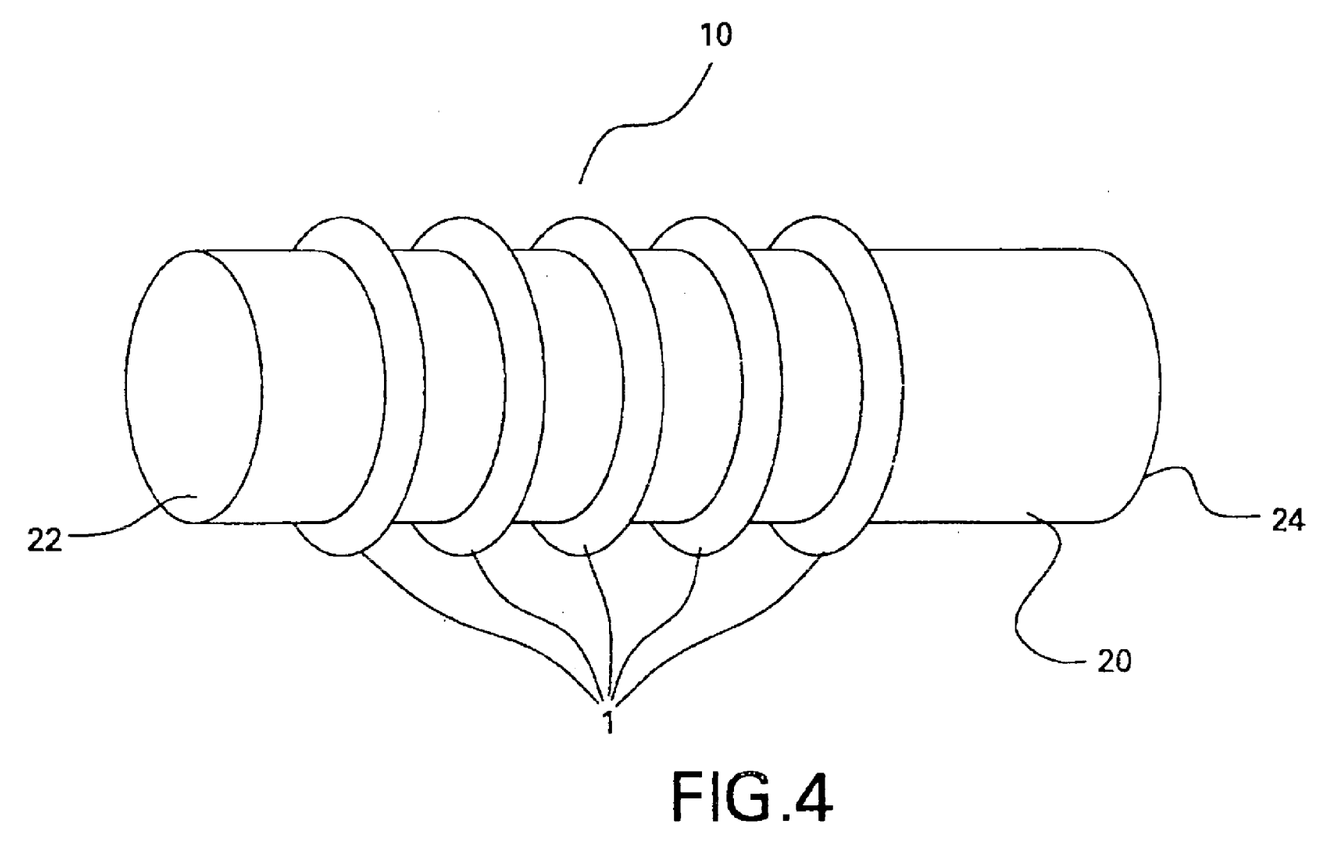
FIG. 4 shows the detonation chamber of FIG. 3 in perspective view.

A shock wave reflector 10 embodiment of the present invention is described with reference to FIGS. 3 and 4. As seen in FIG. 3 in cross-sectional view, the shock wave reflector 10 includes a number of reflective units 1 positioned along a longitudinal direction 2. Neighboring reflective units 1 are separated by a gap G, and each reflective unit has a length L, as indicated in FIG. 3. The length L and the gap G are governed by a relationship:

$$L+G \geq \lambda.$$

As used here, the variable $\lambda$ characterizes the cell size for a detonation mixture.

Figure 2:
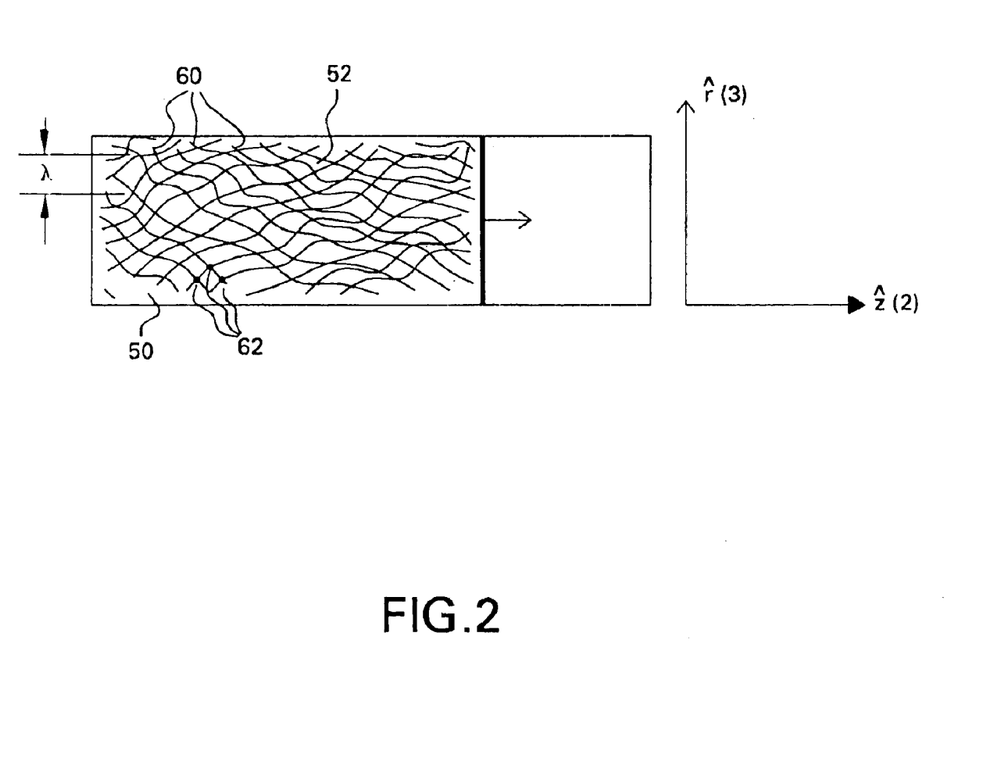
FIG. 2 illustrates a cellular pattern for detonation.

By way of background, cell size $\lambda$ is a fundamental property of detonations. More particularly, cell size $\lambda$ is a function of the initial temperature $T_0$ and pressure $P_0$ and of the detonation mixture, namely of the fuel and oxidizers composing the detonation mixture. A schematic diagram of a cellular structure 52 associated with detonations is illustrated in FIG. 2. A cellular pattern 50 results from interactions between transverse shock waves 60 traveling in a latitudinal direction 3 behind the detonation 52. The intersection points (or "hot spots") 62 of transverse shock waves 60 have high local temperature T and pressure P values, and detonation is seeded at intersection points 62.

Figure 5:
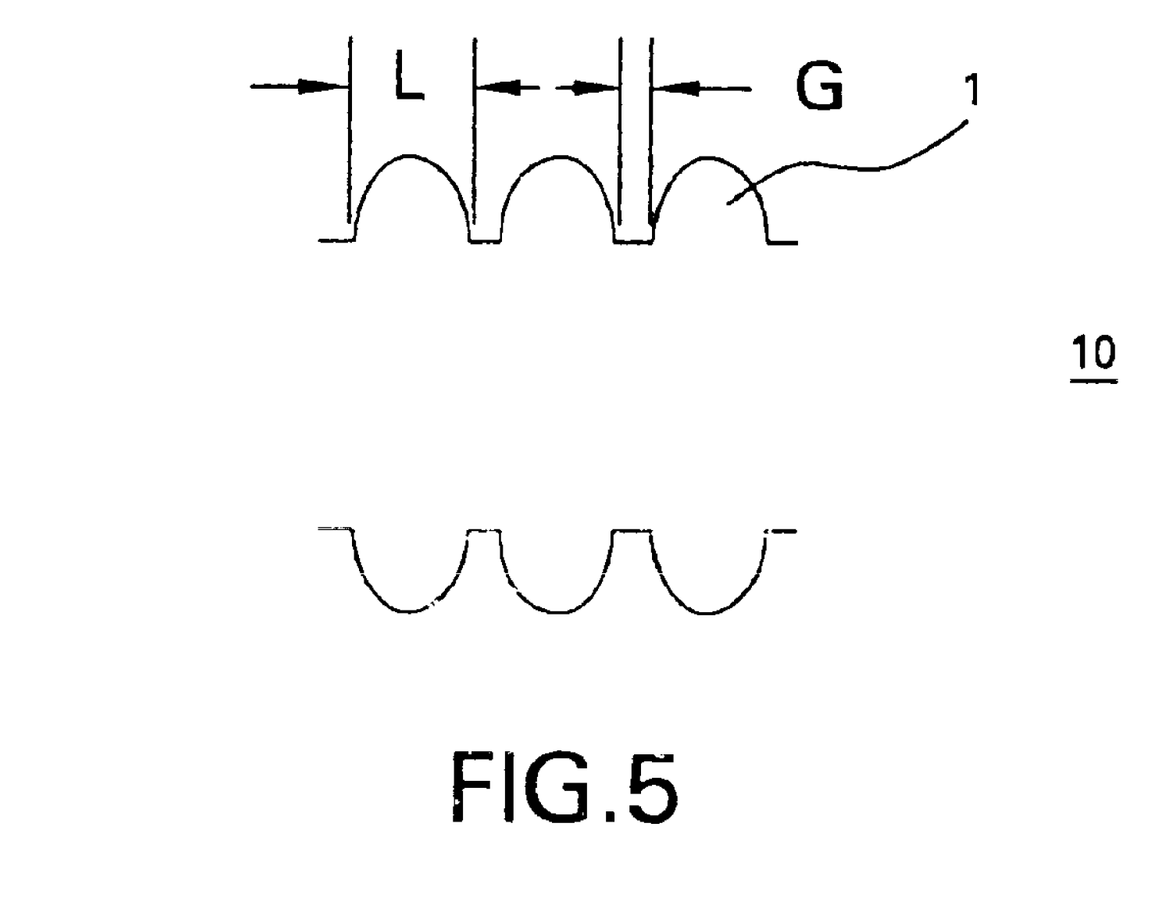
FIG. 5 shows a shock wave reflector embodiment having reflective units, which are semi-elliptical in cross section.
Figure 6:
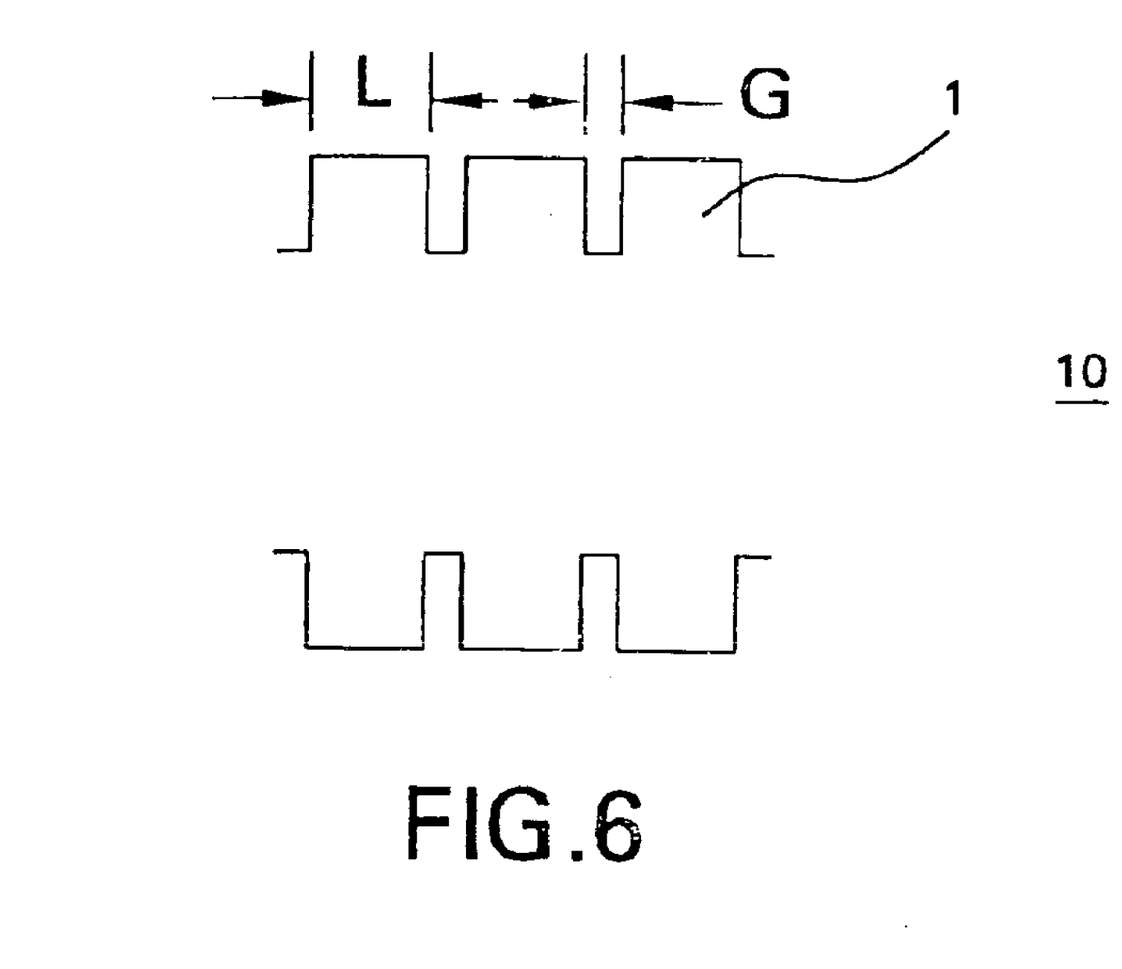
FIG. 6 shows a shock wave reflector embodiment having reflective units, which are open polygons in cross section.

Referring back to FIGS. 3 and 4, exemplary reflective units 1 are annular. Although reflective units 1 are shown in FIG. 3 as being semi-circular in cross-section, other exemplary reflective units 1 are semi-elliptical or open-polygonal in cross-section, as shown for example in FIGS. 5 and 6, respectively. By the terms "semi-elliptical" and "open-polygonal," it is meant that the cross-sections correspond to a portion of an ellipse or to an open polygon, respectively. Further, although reflective units 1 are shown as being smooth, reflective units may also be jagged.

Beneficially, shock wave reflector 10 reduces the deflagration-to-detonation transition length (DDT), thereby enhancing detonation. By reflecting transverse shock waves 60 from reflective units 1, energy is focused at "hot spots" 62, producing high local temperature T and pressure P values at hot spots 62. In this manner, the transition to detonation is enhanced, by producing the hot spots over a shorter longitudinal distance. More particularly, by setting the sum of the length L and gap G equal to be equal to or to exceed the cell size $\lambda$ for the detonation mixture, full transverse shock waves are enclosed by the pattern formed by the reflective units 1, focusing the energy stored in the transverse shock waves to create hot spots 62 over a shorter distance.

To further enhance the focusing of energy at hot spots 62, according to a particular embodiment length L and gap G are governed by a relationship:

$$L+G=n\lambda.$$

As used here, the variable n denotes an integer.

According to another particular embodiment, shock wave reflector 10 includes at least ten (10) reflective units 1. Beneficially, this configuration further enhances hot spot seeding due to the number of reflective units.

Figure 7:
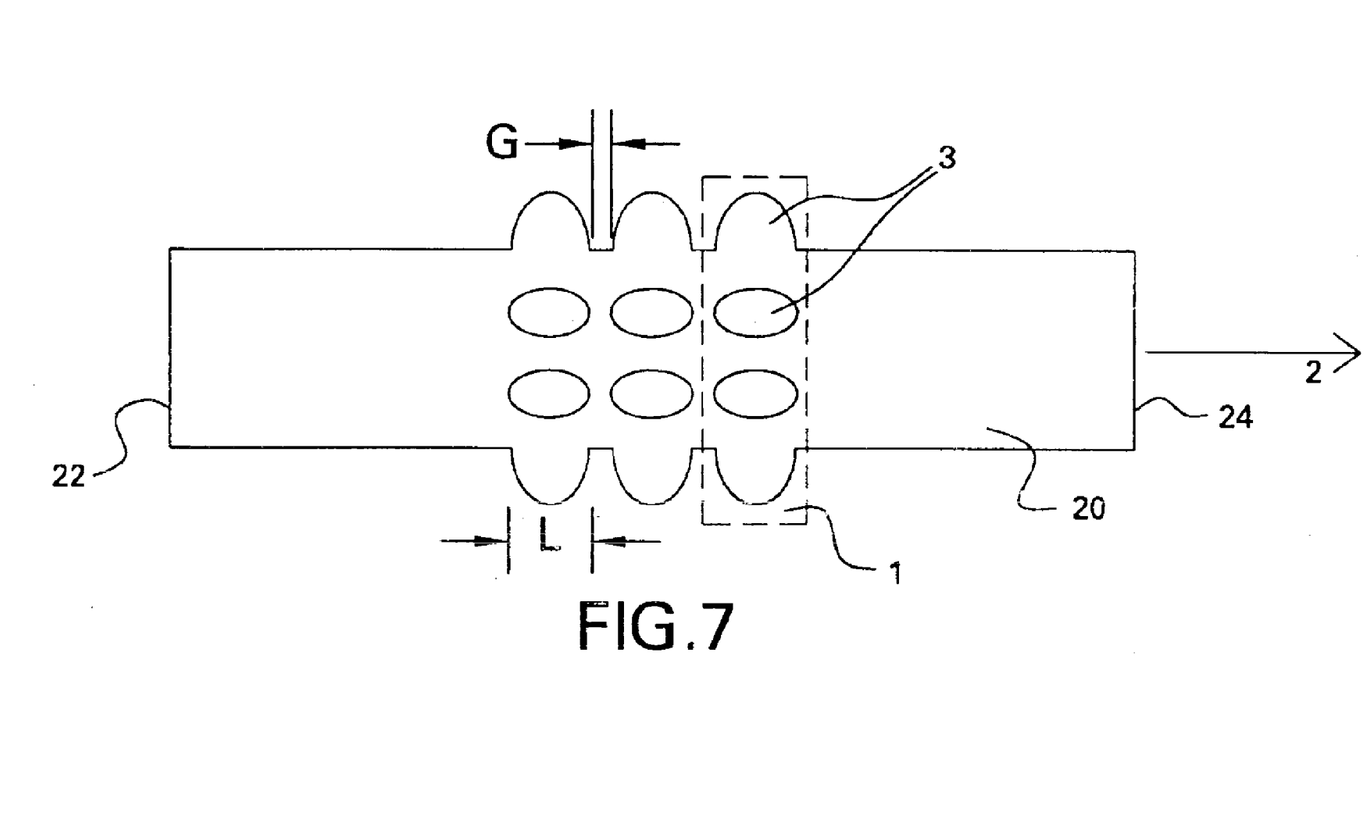
FIG. 7 illustrates alternative shock wave reflector embodiment of the invention, which incorporates cavities.

An alternative shock wave reflector 10 embodiment is illustrated in FIG. 7. For this embodiment, each reflective unit 1 includes a cavity 3. Exemplary cavities 3 are elliptical, as shown in FIG. 7. Other exemplary cavities 3 are hemispheres or open polyhedrons (not shown). According to a particular embodiment, shock wave reflector 10 includes at least ten (10) cavities 3.

Figure 8:
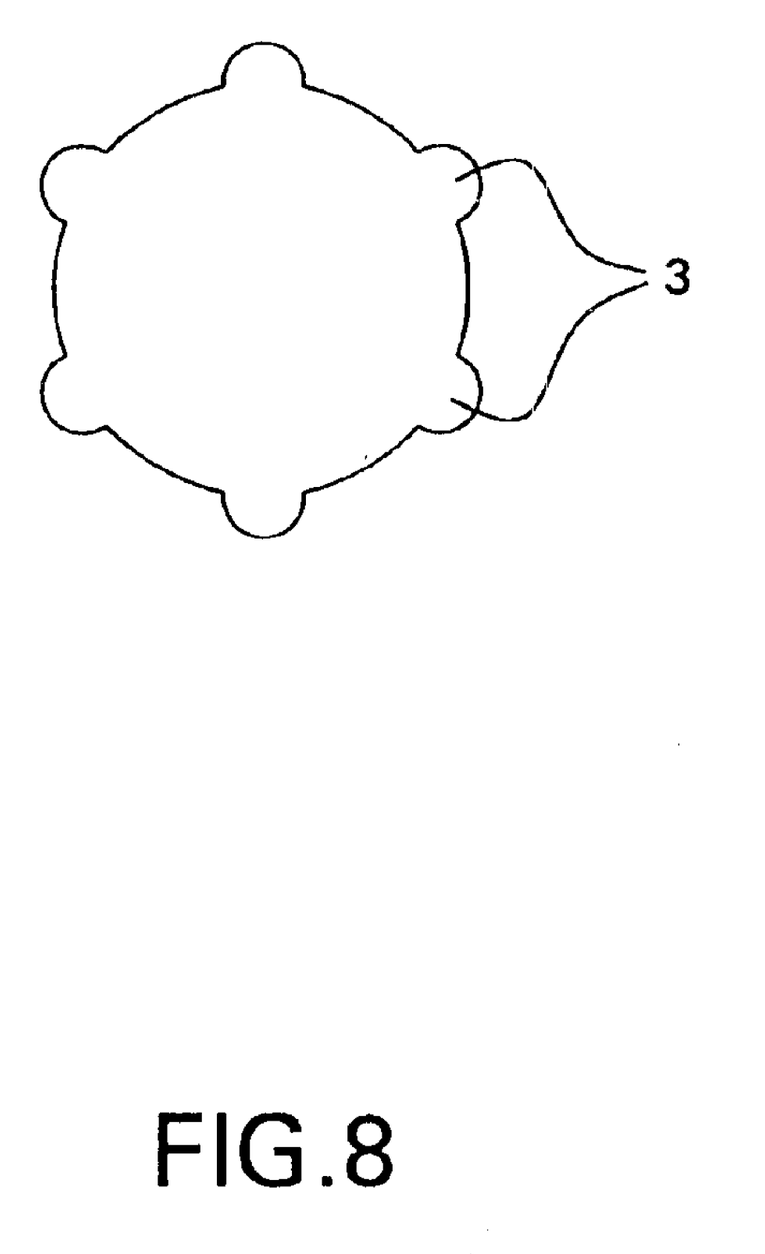
FIG. 8 is a cross-sectional view of a reflective unit of the shock wave reflector of FIG. 7.

For reflection enhancement, in a more particular embodiment, each reflective unit 1 (indicated by dashed line in FIG. 7) includes a number of cavities 3 positioned at a respective number of angular orientations. Reflective unit 1 is shown in cross-sectional view in FIG. 8. For detonation enhancement, shock wave reflector 10 according to a more particular embodiment includes at least ten (10) reflective units 1. For the shock wave reflector 10 embodiment shown in FIG. 7, the length L of reflective units 1 and gap G between neighboring reflective units 1 are governed by the relationship $L+G \geq \lambda$, only in a preferred embodiment.

A detonation chamber 20 embodiment is described with reference to FIGS. 3 and 4. As seen in FIG. 3 in cross-sectional view, detonation chamber 20 includes a receiving end 22, a discharge end 24, and a wall 26 extending along a longitudinal direction between receiving and discharge ends 22, 24. Fuel and oxygen are introduced at receiving end 22. Exemplary fuel types include hydrogen, propane, JP10, JP8, JetA, $C_2H_2$, and $C_2H_4$. Exemplary oxygen sources include $O_2$ and air, for example liquid $O_2$ and liquid air. However, the invention is not limited to any particular fuel/oxygen mixtures. As seen in FIG. 3, detonation chamber further includes a number of reflective units 1 formed in wall 26 and positioned along longitudinal direction 2. Reflective units 1 are separated by gap G and have length L. According to a particular embodiment, length L and gap G are governed by the relationship $L+G \geq \lambda$, to enhance the focusing of transverse shock waves by reflective units 1.

One exemplary material for wall 26 and reflective units 1 is stainless steel. However, the invention is not limited to any specific materials.

According to a particular embodiment, reflective units 1 are integral to wall 26, meaning that the reflective units and wall 26 are either machined from a single piece (not shown) or are attached in a continuous manner, for example by welding.

According to a particular embodiment, at least one of reflective units 1 is formed in a vicinity of receiving end 22. By the phrase "in the vicinity," it is meant that the reflective unit in question is closer to receiving end 22 than to discharge end 24.

In one embodiment, each reflective unit 1 extends around an inner surface 28 of wall 26. As discussed above, exemplary reflective units 1 are semi-circular, semi-elliptical, or open-polygons in cross-section. According to a more particular embodiment, reflective units 1 are annular, as shown in FIGS. 3 and 4.

To further enhance detonation, detonation chamber 20 according to a more particular embodiment includes at least ten (10) reflective units 1.

An alternative detonation chamber 20 embodiment is illustrated in FIG. 7 in side view. For this embodiment, each reflective unit 1 includes a cavity 3. As discussed above, exemplary cavities 3 are hemispheric, elliptical, or open polyhedrons. To enhance detonation, detonation chamber 20 includes at least ten (10) cavities 3, according to a more particular embodiment.

For reflection enhancement, in a more particular embodiment each reflective unit 1 (indicated by dashed line in FIG. 7) includes a number of cavities 3 formed in wall 26 and positioned at a respective number of angular orientations on inner surface 28 of wall 26. Reflective unit 1 is shown in cross-sectional view in FIG. 8. For detonation enhancement, detonation chamber 20 according to a more particular embodiment includes at least ten (10) reflective units 1. For the detonation chamber 20 embodiment shown in FIG. 7, the length L of reflective units 1 and gap G between neighboring reflective units 1 are governed by the relationship $L+G \geq \lambda$, only in a preferred embodiment.

Figure 9:
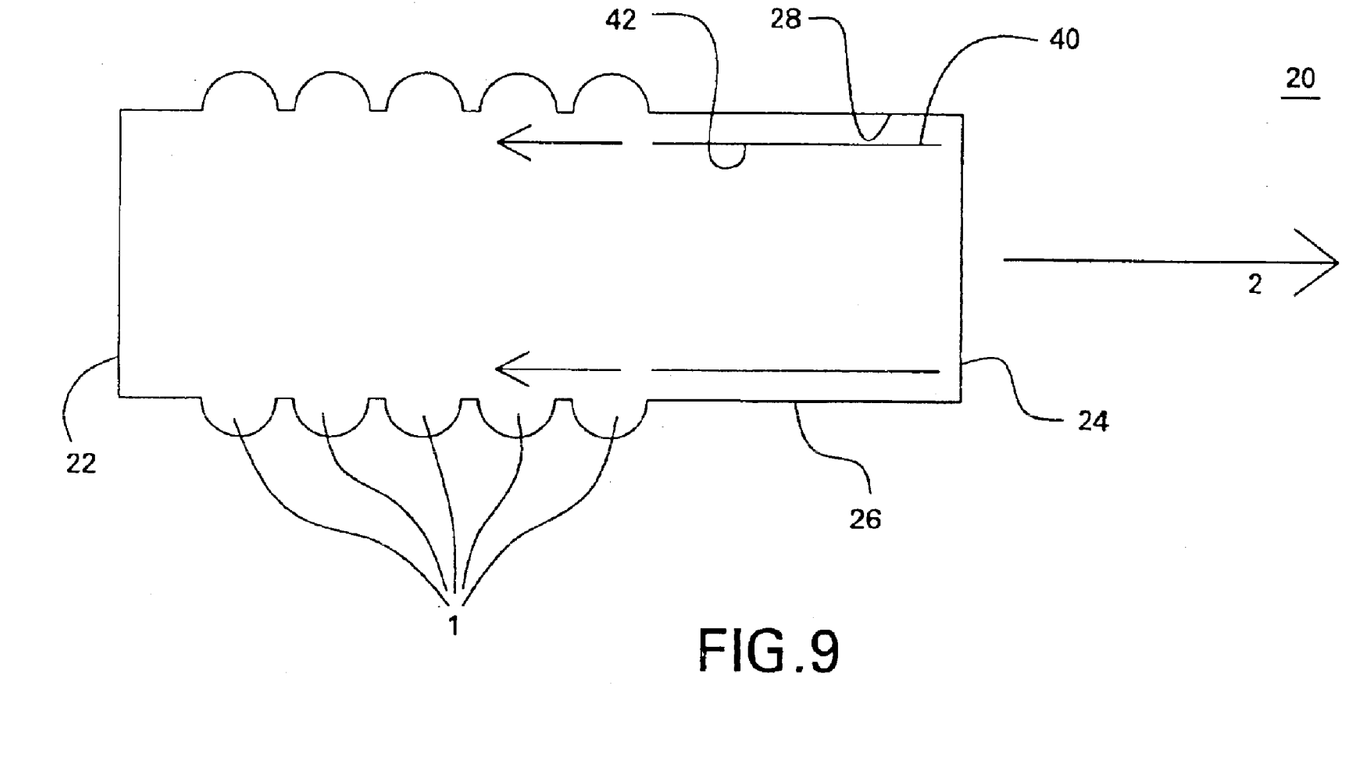
FIG. 9 illustrates an alternative detonation chamber embodiment including a slidably configured liner, which is in an open position.
Figure 10:
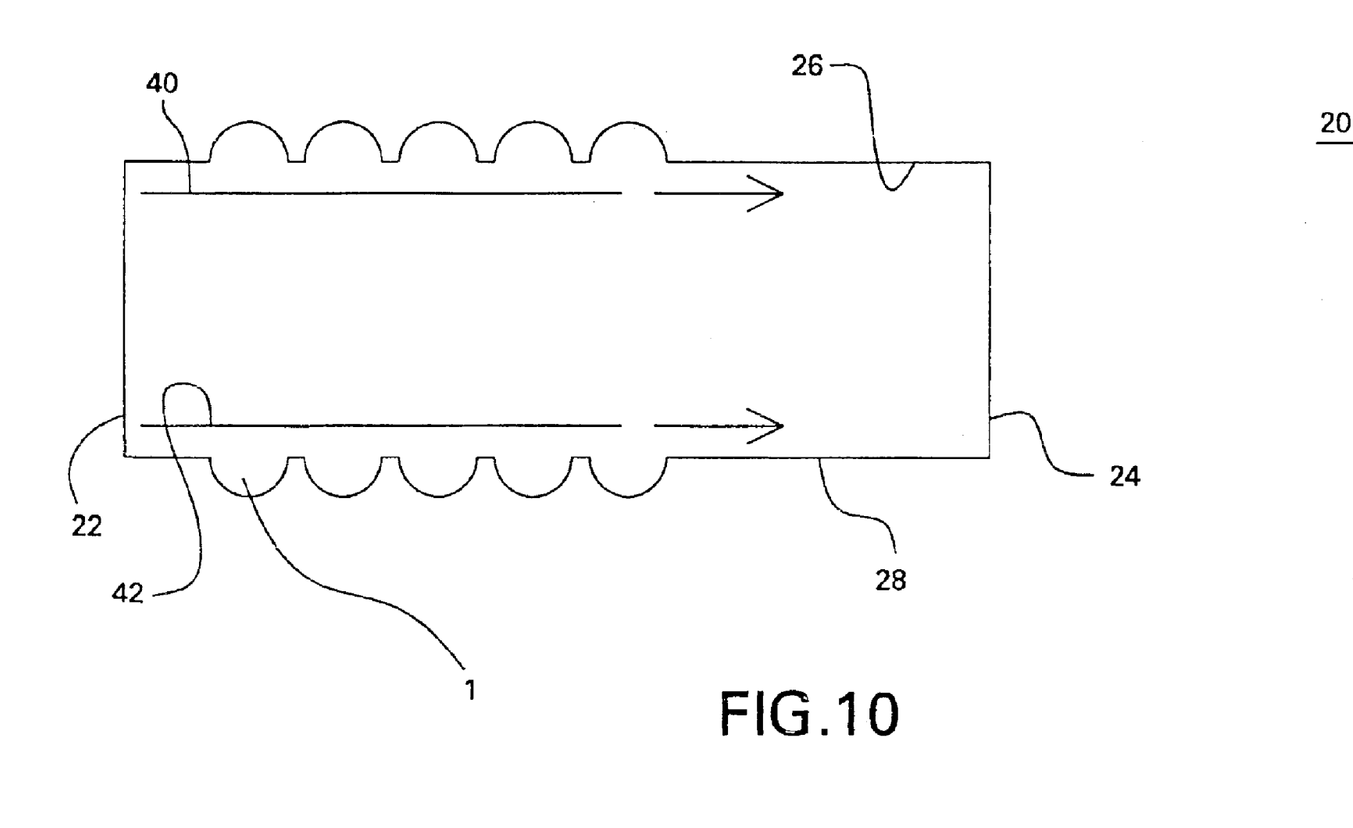
FIG. 10 shows the detonation chamber of FIG. 9 with the liner in a shielding position.

As known to those skilled in the art, the configuration of a detonation chamber 20 varies, depending on the use to which it is put. Exemplary uses include rockets, air breathing engines such as turbofan engines, and stationary power generators. However, for a particular embodiment, receiving end 22, discharge end 24, and wall 26 form a detonation tube (also indicated by reference numeral 20). The term "tube" is used here to mean a generally cylindrical shape, as shown for example in FIGS. 3, 4, and 7. However, the present invention is not limited to detonation tubes but encompasses detonation chambers having other shapes that incorporate the features of the invention. According to a more particular embodiment shown in FIGS. 9 and 10, detonation chamber 20 further includes a liner 40 positioned between receiving and discharge ends 22, 24 within wall 26. Liner 40 is configured to slide between an open position, which is illustrated in FIG. 9 and a shielding position, which is illustrated in FIG. 10. In the open position, access to reflective units 1 exists, whereas in the shielding position, liner 40 blocks access to reflective units 1. Although shown only in cross-section in FIGS. 9 and 10, liner 40 has the shape of a hollow tube with a smooth inner surface 42, relative to the curved surface of reflective units 1. The latter configuration with liner 40 is particularly useful for detonation chambers 20 which are alternately used in detonation/deflagration and exhaust modes. For example, an afterburner is employed in military applications to alternate between an exhaust mode, for which a smooth surface (liner 40 in shielding position) is desirable, and a detonation/deflagration mode (liner 40 in open position) to provide additional thrust, for which the reflective units 1 are desirable.

Figure 11:
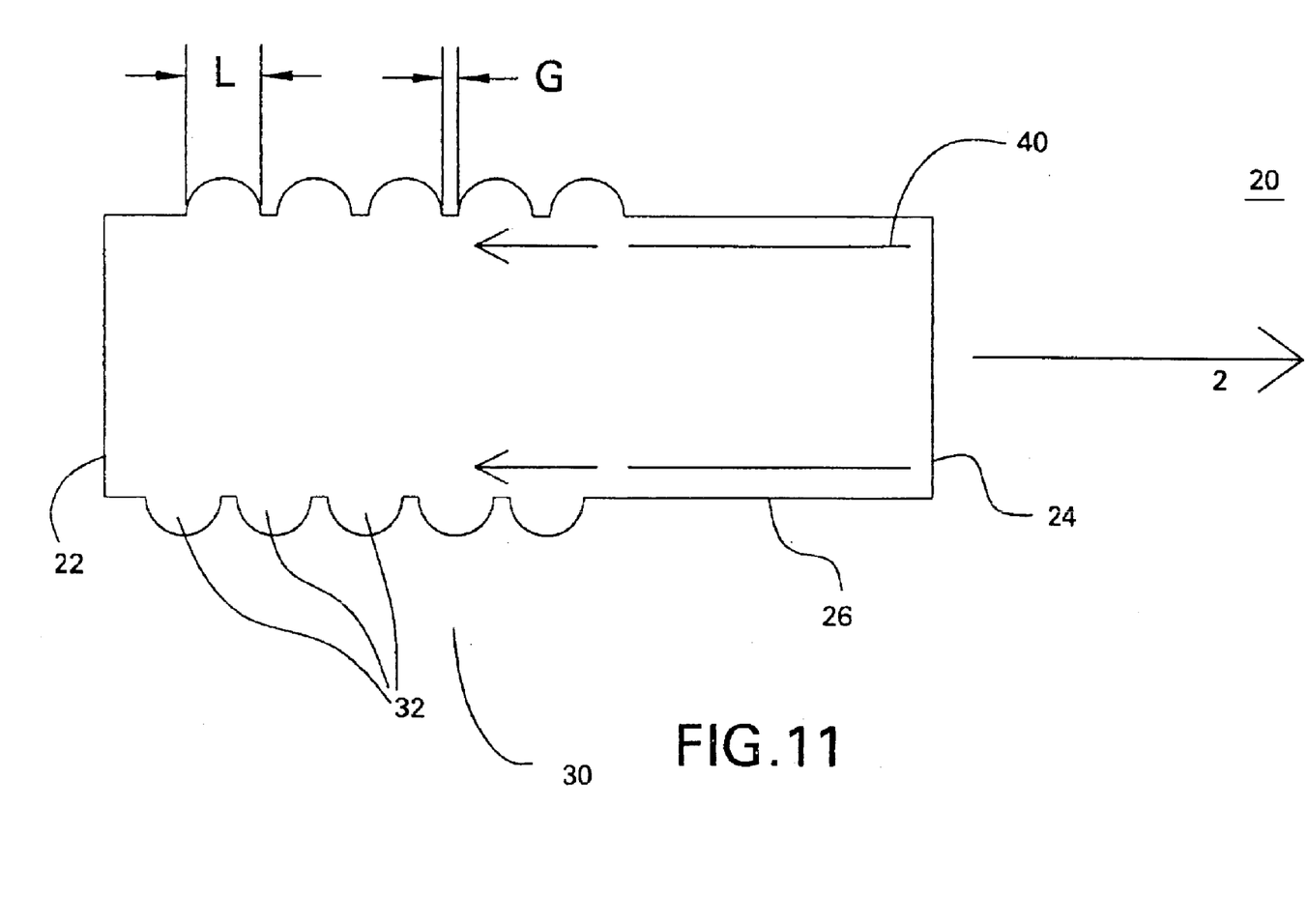
FIG. 11 illustrates another detonation chamber embodiment and a spiral reflective unit embodiment of the invention in cross-sectional view.
Figure 12:
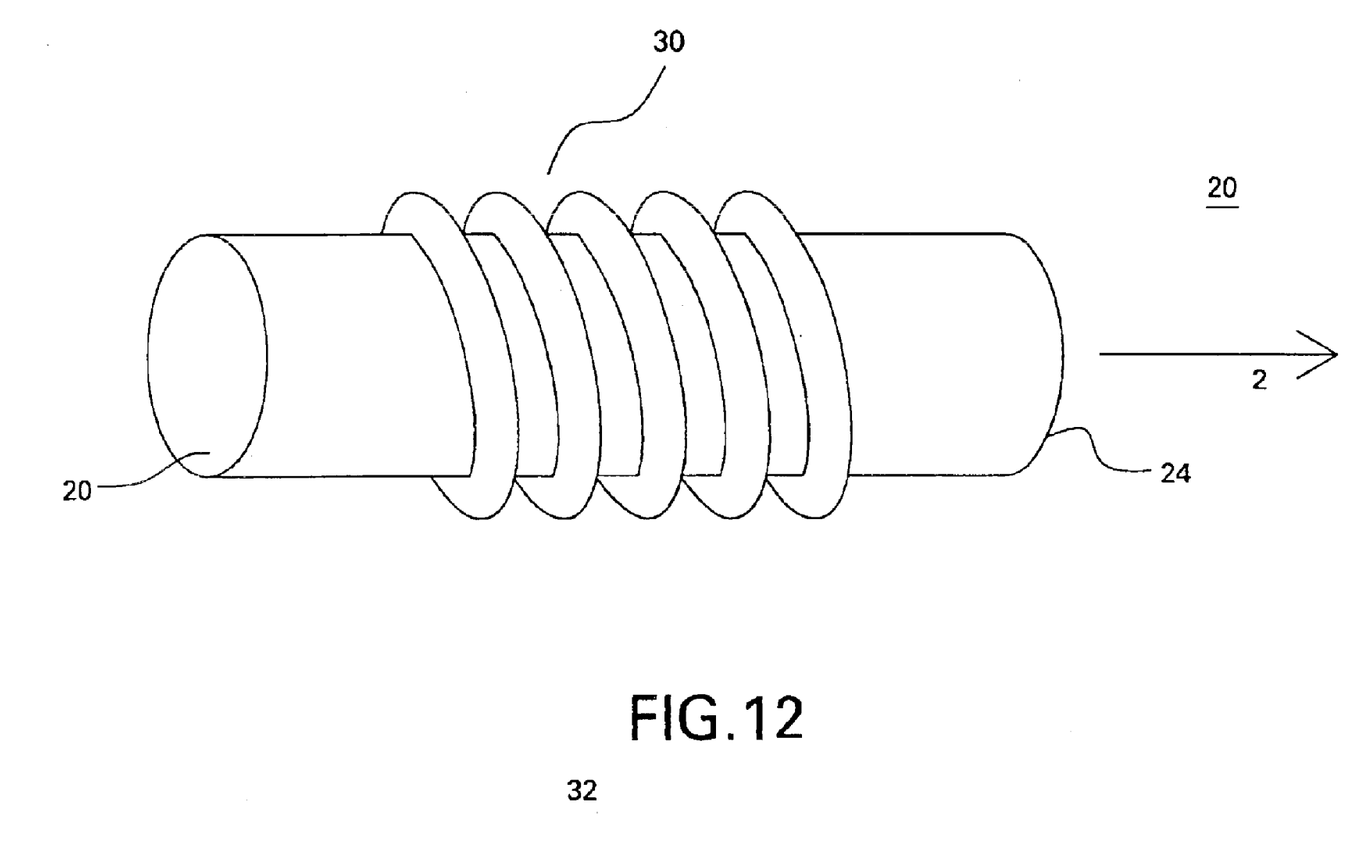
FIG. 12 shows the detonation chamber of FIG. 10 in perspective view.

Another detonation chamber 20 embodiment is illustrated in FIGS. 11 and 12. As seen in FIG. 11, detonation chamber 20 for this embodiment includes receiving and discharge ends 22, 24, wall 26, and a spiral reflective unit 30 formed in wall 26. Spiral reflective unit 30 extends along longitudinal direction 2 and includes a number of windings 32. Similar to the reflective units 1 discussed above, each winding has length L, and neighboring windings are separated by gap G. Length L and gap G are governed by the relationship:

$$L+G \geq \lambda,$$

which is discussed above with respect to reflective units 1. According to a more particular embodiment, the sum of length L and gap G is equal to an integer multiple of the variable λ, to further enhance detonation. Exemplary windings 32 are semi-circular, semi-elliptical, or open-polygons in cross-section. Beneficially, spiral reflective unit 30 increases ease of manufacturability for detonation chamber 20 and can be formed, for example, using a tap.

To enhance detonation, spiral reflective unit 30 according to a particular embodiment includes an end 34 formed in a vicinity of receiving end 22. According to a more particular embodiment, discharge end 24, and wall 26 form a detonation tube 20. For another embodiment, detonation chamber 20 further includes liner 40, as indicated in FIG. 11 and discussed above.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A shock wave reflector comprising:
   a plurality of reflective units positioned along a longitudinal direction and separated by a gap G, each reflective unit having a length L,
   wherein the length L and the gap G are governed by a relationship:

$$L+G \geq \lambda,$$

wherein the variable λ characterizes a cell size for a detonation mixture, and the reflective units are cavities of semi-elliptical cross-section and are configured to focus a shock wave to enhance the transition to detonation of the detonation mixture.

2. The shock wave reflector of claim 1, wherein said reflective units are annular.

3. The shock wave reflector of claim 1, wherein said reflective units are semi-circular in cross-section.

4. The shock wave reflector of claim 1, wherein said plurality of reflective units comprises at least ten reflective units.

5. The shock wave reflector of claim 1, wherein each of said reflective units comprises a cavity.

6. The shock wave reflector of claim 5, wherein said cavity is hemispheric.

7. The shock wave reflector of claim 5, wherein said plurality of reflective units comprises at least ten cavities.

8. The shock wave reflector of claim 1, wherein each of said reflective units comprises a plurality of cavities positioned at a respective plurality of angular orientations.

9. The shock wave reflector of claim 8, wherein each cavity is hemispheric.

10. The shock wave reflector of claim 8, wherein said plurality of reflective units comprises at least ten reflective units.

11. The shock wave reflector of claim 1, wherein the length L and the gap G are governed by a relationship:

$$L+G=n\lambda,$$

the variable n denoting an integer.

12. A detonation chamber comprising:
    a receiving end;
    a discharge end;
    a wall extending along a longitudinal direction between said receiving and discharge ends; and
    a plurality of reflective units formed in said wall, positioned along the longitudinal direction, and separated by a gap G, each reflective unit having a length L, wherein the length L and the gap G are governed by a relationship:

$$L+G \geq \lambda, \text{ and}$$

wherein the variable λ characterizes a cell size for a detonation mixture, and the reflective units are cavities of semi-elliptical cross-section and are configured to focus a shock wave to enhance the transition to detonation of the detonation mixture.

13. The detonation chamber of claim 12, wherein at least one of said reflective units is formed in a vicinity of said receiving end.

14. The detonation chamber of claim 13, wherein each of said reflective units extends around an inner surface of said wall.

15. The detonation chamber of claim 13, wherein each of said reflective units comprises a cavity.

16. The detonation chamber of claim 12, wherein said reflective units are semi-circular, in cross-section.

17. The detonation chamber of claim 12, wherein said reflective units are annular.

18. The detonation chamber of claim 17, wherein said plurality of reflective units comprises at least ten reflective units.

19. The detonation chamber of claim 12, wherein each of said reflective units comprises a plurality of cavities formed in said wall and positioned at a respective plurality of angular orientations on said inner surface of said wall.

20. The detonation chamber of claim 12, wherein said receiving end, discharge end, and wall form a detonation tube.

21. The detonation chamber of claim 12, further comprising:
    a liner positioned between said receiving and discharge ends within said wall, wherein said liner is configured to slide between an open position and a shielding position.

22. The detonation chamber of claim 12, wherein the length L, and the gap G are governed by a relationship:

$$L+G=n\lambda,$$

the variable n denoting an integer.

* * * * *

UNITED STATES PATENT AND TRADEMARK OFFICE
CERTIFICATE OF CORRECTION

PATENT NO. : 6,877,310 B2  Page 1 of 1
DATED : April 12, 2005
INVENTOR(S) : Ivett Alejandra Leyva It is certified that error appears in the above-identified patent and that said Letters Patent is hereby corrected as shown below:

<u>Column 1,</u>
Line 8, delete "contract number DABT 63-00-C-001 awarded by DARPA." and insert
-- contract number DABT 63-00-C-0001 awarded by DARPA. --.

Signed and Sealed this

Twenty-fifth Day of April, 2006

JON W. DUDAS
*Director of the United States Patent and Trademark Office*